(12) United States Patent
Lewis

(10) Patent No.: US 6,471,249 B1
(45) Date of Patent: Oct. 29, 2002

(54) ADJUSTABLE PIPE CONNECTOR

(76) Inventor: John K. Lewis, 14006 Blazey Dr., Houston, TX (US) 77095

( * ) Notice: Subject to any disclaimer, the term of this patent is extended or adjusted under 35 U.S.C. 154(b) by 0 days.

(21) Appl. No.: 09/168,593

(22) Filed: Oct. 8, 1998

(51) Int. Cl.$^7$ .................................................. F16L 21/00
(52) U.S. Cl. ........................... 285/31; 285/331; 285/32; 285/22
(58) Field of Search ............................ 285/15, 31, 302, 285/288.1, 288.2, 398, 371, 331, 3, 22, 32; 138/89

(56) References Cited

U.S. PATENT DOCUMENTS

| | | | |
|---|---|---|---|
| 1,980,561 A | * 11/1934 | Wagner | .................. 219/137 R |
| 2,156,604 A | 5/1939 | Payne | |
| 2,366,579 A | 1/1945 | Von Ahrens | |
| 2,764,426 A | 9/1956 | Von Ahrens | |
| 2,814,508 A | 11/1957 | Seamark | |
| 2,915,110 A | 12/1959 | Ferguson | |
| 3,076,261 A | 2/1963 | Christensen | |
| 3,165,082 A | 1/1965 | Baker | |
| 3,224,797 A | 12/1965 | Hausmann | |
| 3,224,798 A | 12/1965 | Hausmann | |
| 3,466,065 A | * 9/1969 | Acker et al. | .................... 285/3 |
| 3,508,766 A | 4/1970 | Kessler | |
| 3,677,575 A | * 7/1972 | Wedel | ........................... 285/3 |
| 3,961,814 A | 6/1976 | Byrne | |
| 4,114,654 A | * 9/1978 | Richardson | .................. 138/89 |
| 4,257,630 A | 3/1981 | Bartell | |
| 4,436,325 A | * 3/1984 | Miller | ........................ 285/331 |
| 4,607,664 A | * 8/1986 | Carney et al. | ................. 285/3 |
| 4,619,470 A | 10/1986 | Overath | |
| 4,739,799 A | * 4/1988 | Carney et al. | ................ 138/89 |
| 4,786,089 A | 11/1988 | McConnell | |
| 4,811,975 A | 3/1989 | Paul | |
| 4,913,465 A | 4/1990 | Abbema | |
| 5,096,206 A | 3/1992 | Andre | |
| 5,131,694 A | 7/1992 | Portis | |
| 5,219,187 A | 6/1993 | Mikitka | |
| 5,346,261 A | 9/1994 | Abbema | |
| 5,547,228 A | 8/1996 | Abbema | |
| 5,552,057 A | 9/1996 | Hughes | |
| 5,566,984 A | 10/1996 | Abbema | |
| 6,234,538 B1 | * 5/2001 | Lauer | ........................... 285/3 |

* cited by examiner

Primary Examiner—Lynne H. Browne
Assistant Examiner—Aaron M Dunwoody
(74) Attorney, Agent, or Firm—Streets & Steele; Jeffrey L. Streets

(57) ABSTRACT

An adjustable pipe connector for joining ends of lined pipe where corrosive or erosive gases, fluids or slurries may flow to provide a continuous corrosion barrier between the ends of adjacent pipe liners. The connector provides a telescoping arrangement of sleeves that may be adjusted in length to meet the needs of the pipes being welded. The connector also provides heat shielded weld points for welding to the pipe ends to ensure that the integrity of the pipe coatings is maintained.

13 Claims, 3 Drawing Sheets

ADJUSTABLE PIPE CONNECTOR

BACKGROUND OF THE INVENTION

1. Field of the Invention

The present invention relates to the field of pipe connections. More particularly, the present invention relates to the field of welded pipe connections normally useful in oil and gas production, refining and transportation industries.

2. Background of the Related Art

Corrosion barriers are useful in conjunction with pipes by joining pipes whose interior regions are coated with protective materials, such as thin polymer based coatings or cement based liners, which form a protective barrier between the pipe material and the materials passing through the pipe. In some instances, such as in highly corrosive environments, the protective barrier may be constructed of a tubular PTFE liner or other polymer based material.

In the oil and gas transportation industry, the most common method of connecting individual lengths of pipe is by welding the ends together. Welding of the pipe ends presents several pipe material protection problems. The Cylindrical Corrosion Barrier For Pipe Connections, U.S. Pat. Nos. 5,547,228 and 5,566,984 provide for methods of solving those pipe material protection problems and are incorporated by reference herein.

Another problem arises in pipe welds when a section of pipe is being repaired, replaced or otherwise joined to another section of pipe and residual gases, fluids or vapors may be present in the pipe section adjacent the work site. These residual fluids or vapors often present a hazardous situation for welding two pipe sections together and have been isolated from the welding site in a number of ways, such as inserting a large rubber plug into the exposed ends of the pipe. However, the plug is typically not removable and, when the pipe is put back into service, may become lodged or otherwise form a restriction or trash buildup in the pipe.

Yet another problem arises in repairing, replacing or otherwise joining a pipe section to another pipe section, when the pipe section must be continuously lined even across the area of the pipe weld. This problem is inherent with rigid pipe and rigid linings that must be fabricated to an exact length in order to be positioned and welded between two fixed ends of pipe, such as the two pipe ends exposed when a worn section of pipe is cut out and replaced. Particularly over short distances, a new pipe section having a nearly exact length and a liner having sufficient length to extend beyond the ends of the new pipe section, across the weld area and into communication with a liner or coating in the adjacent two pipe ends, can not be physically manipulated into positioned.

Therefore, there is a need for a lined or coated pipe section that can be welded between two ends of an existing lined or coated pipeline and provide a continuous protection barrier in the pipe, even across the area of the weld. It would be desirable if the lined or coated pipe section could be installed even between pipe ends spaced at very short distances. It would be further desirable if the lined or coated pipe section were designed to avoid being damaged during welding of the pipe section into the pipe line. Preferably, the lined or coated pipe section would be of equal or greater physical strength than the rest of the pipeline. Optionally, it would be desirable if the lined or coated pipe section could be used to isolate hazardous gases, fluids or vapors from the site of the weld.

SUMMARY OF THE INVENTION

The present invention provides an adjustable pipe connector which provides a connection between the ends of adjacent sections of pipe where hazardous, corrosive or flammable gases, fluids or slurries flow therethrough. In one embodiment of the invention, the connector is particularly useful for joining pipe ends that are coated and/or contain corrosion barriers like the one described in U.S. Pat. No. 5,566,984. When two pipe ends are provided with corrosion barriers, it may be difficult if not impossible to place a standard connector between the pipe ends without damaging the corrosion barrier. Therefore, the present pipe connector has multiple telescoping sleeves that provide intimate contact with the pipe ends and can be adjusted in length to accommodate the two pipe ends each with a corrosion barrier positioned therein One embodiment of the pipe connector has a first sleeve with a generally cylindrical inner surface; a second sleeve positioned inside the first cylindrical sleeve; a third sleeve positioned inside the second cylindrical sleeve, and a fourth sleeve positioned inside the third cylindrical sleeve, such that the first, second, third, and fourth sleeves are coaxially aligned with one another. Preferably, the generally cylindrical inside surface of the first sleeve defines an annular shoulder facing the first end of the first sleeve and a minor diameter portion extending from the annular shoulder toward the first end. The inner surface of the first sleeve near the first end contacts the outer surface of the third sleeve in a telescoping relationship. The second sleeve has first and second ends and the outer surface of the second sleeve contacts the inner surface of the first sleeve adjacent to the minor diameter portion. The inside surface of the second sleeve contacts the outer surface of the third sleeve near the first end and the outside surface of the fourth sleeve near the second end.

Preferably, the third sleeve has first and second ends and the inside surface near the first end contacts the outside surface of the fourth sleeve. The fourth sleeve has first and second ends and the generally cylindrical outer surface preferably defines an annular shoulder facing the first end and a minor diameter portion extending from the annular shoulder toward the first end.

In another embodiment, there is provided a pipe plug useful for joining coated and uncoated pipes that have once had flammable or caustic vapors or fluids flowing therethrough. The pipe plug provides a temporary protective barrier that is easily broken and displaced once the pipe section is fully installed and put back into service. The pipe plug has a cylindrical sleeve having an outer surface, an inner surface, a first and second end; a barrier extending over the first end of the cylindrical sleeve. The barrier is temporary and acts to contain vapors and/or gases that may be present in the pipe. The outer surface of the first end of the sleeve sealingly engages the inside surface of a pipe end to hold the plug and barrier in place while the pipe is being repaired.

The outer surface of the plug preferably has at least one circumferentially extending recess and a sealing element positioned within the recess. A barrier ring may be positioned around the barrier to hold the barrier over the first end of the sleeve. An additional circumferential recess disposed in the outer surface of the cylindrical sleeve has a metal ring disposed therein for completing a weld to another pipe end if necessary.

Another embodiment of the present invention provides a pipe connector having an extendable pipe structure with a middle, first and second pipe ends. The extendable pipe structure has an inner cylindrical surface of a diameter that is substantially the same as the inner diameter of the pipe and first and second concentric pipe sleeves extending from the first and second pipe ends toward the middle. The concentric pipe sleeves are engaged in a telescopic relationship.

There is an extendable pipe liner with a middle, first and second liner ends having an outer cylindrical surface of a diameter that is substantially the same as the inner diameter of the pipe to be connected, and first and second concentric liner sleeves extending from the first and second liner ends toward the middle. The concentric liner sleeves are also engaged in a sealed telescopic relationship.

The first and second liner ends are coupled to the first and second pipe ends and extend beyond the first and second pipe ends. The portion of the first and second liner ends extending beyond the first and second pipe ends has one or more sealing members disposed in the outer cylindrical surface thereof for sealing against the inner surface of the pipe. The first and second liner sleeves are supported by the first and second pipe sleeves.

Preferably, the inner surface of the first concentric sleeve forms an annular shoulder in one end of the pipe structure facing the middle of the pipe structure and contacts an outer surface of the second concentric sleeve. The first concentric liner sleeve may also have an inner surface that forms an annular shoulder in one end of the liner facing the middle of the pipe liner, where the inner surface of the first concentric sleeve sealingly contacts the outer surface of the second concentric liner sleeve. This construction is useful in that the connector can be retracted so that the sleeves rest on top of one another reducing the unit to a manageable size and extended to a desired length at the point where a connection will be made.

At least one circumferential recess may be disposed in the outer surface of the first liner end and the recess may have a metal ring disposed therein to use in welding the pipe to the pipe connector while insulating the interior of the pipe from the heat generated by the weld.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention relates to an adjustable pipe section for connection between adjacent sections of pipe which are lined, coated or contain barriers, such as to prevent corrosion or contamination. More particularly, the pipe section or connector comprises a set of concentric sleeves in a telescoping configuration so that the pipe section be adjusted in length to accommodate varying distances while providing a static seal and a heat resistant surface for completing the welds with adjoining pipe ends. Preferably, the pipe section has a retracted length for positioning between two adjoining pipe ends and can be telescoped or extended a sufficient length to communicate a lining or barrier member with the interior lining or barrier of both adjoining pipe ends and allow the pipe section to be welded to the adjoining pipe ends.

In another embodiment, there is provided a pipe plug useful for joining pipes that have once had flammable or hazardous vapors or fluids flowing therethrough. The pipe plug provides a temporary protective barrier to ambient vapors or fluids that is easily broken and displaced once the pipe is fully installed and put back into service. Optionally, the pipe plug may be used in conjunction with the adjustable pipe section by incorporating the plug on the end thereof.

Figure 1:
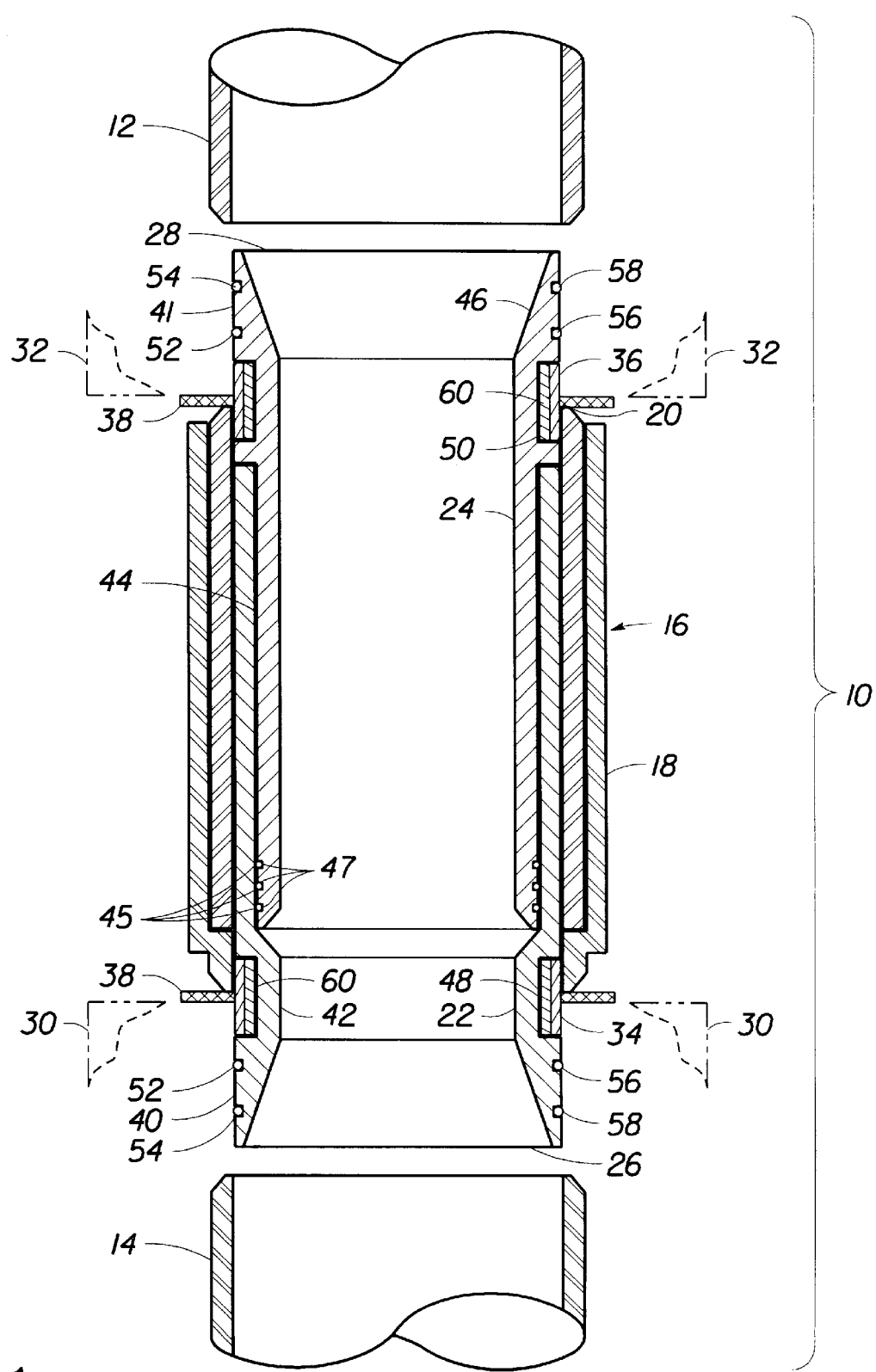
FIG. 1 is a sectional exploded view of one embodiment of the pipe connector of the present invention.

Referring to FIG. 1, one embodiment of the pipe connector 10 of the present invention generally includes a sleeve assembly 16 which is received in adjacent ends 12, 14 of adjacent lengths of internally coated pipe. This embodiment of the invention is primarily useful, but not limited to, pipeline applications wherein a thin protective coating is applied to the inner diameter of the pipe and the pipe ends 12, 14 are welded to a connector without damaging the coating. The pipe ends alternatively may have thicker linings or barriers disposed therein. Such a lining or barrier can be accommodated by modifying the terminal ends of the connector 10 in accordance with FIGS. 6 and 7 of U.S. Pat. No. 5,566,984, which is incorporated by reference herein.

The sleeve assembly 16 includes multiple concentric sleeves 18, 20, 22, and 24, having opposed open ends 26, 28 and shielding portions 30, 32, which are partially received into the pipe ends 12 and 14 when each end of the sleeve assembly 16 is fully received into the pipe ends 12 and 14 respectively. The shielding portions 30, 32 of the sleeve assembly 16 preferably include ring members 34, 36, having three or more, preferably three to six, alignment spacers 38 spaced around the circumference of the ring members and extending radially outwardly therefrom. The spacers 38 are preferably attached to the rings 34, 36 by tack welding, although other attachment means, such as forming the connection of the spacer 38 to the ring 34 or 36 as a rivet, or as a simple mechanical connection capable of being easily broken, may be provided. When the sleeve assembly 16 is properly positioned in the pipe ends 12, 14, the pipe ends 12, 14 contact, or are in close proximity to, the spacers 38. Preferably, the spacers 38 are configured as pins, which extend outwardly from the outer diameter of the pipe, or may be configured as spherical balls.

During a welding operation, particularly a multiple pass welding operation, substantial heat is generated which will increase the temperature of the pipe ends 12, 14 above the burning or transformation temperature of the thin protective coating maintained on the interior surface of the pipe and prior art metallic sleeve. When the areas of the coating on the inside of the pipe and on the inside of the prior art internally coated metallic sleeve are destroyed during welding, the underlying pipe material and sleeve material will be exposed to the gases or fluids which are passed through the pipe. This can cause the pipe or the sleeve to fail. Therefore, to properly protect the weld joint, the sleeve assembly 16 must provide a barrier to prevent the materials such as fluids or gases from contacting, and then eroding and/or corroding, the exposed areas of the pipe, and also provide an uncompromised inner surface on the sleeve assembly 16 to protect the weld and the sleeve assembly 16 from corrosion and/or erosion from the materials passing through the pipe. The sleeve assembly 16 of the present invention may be configured to meet both requirements.

Figure 2:
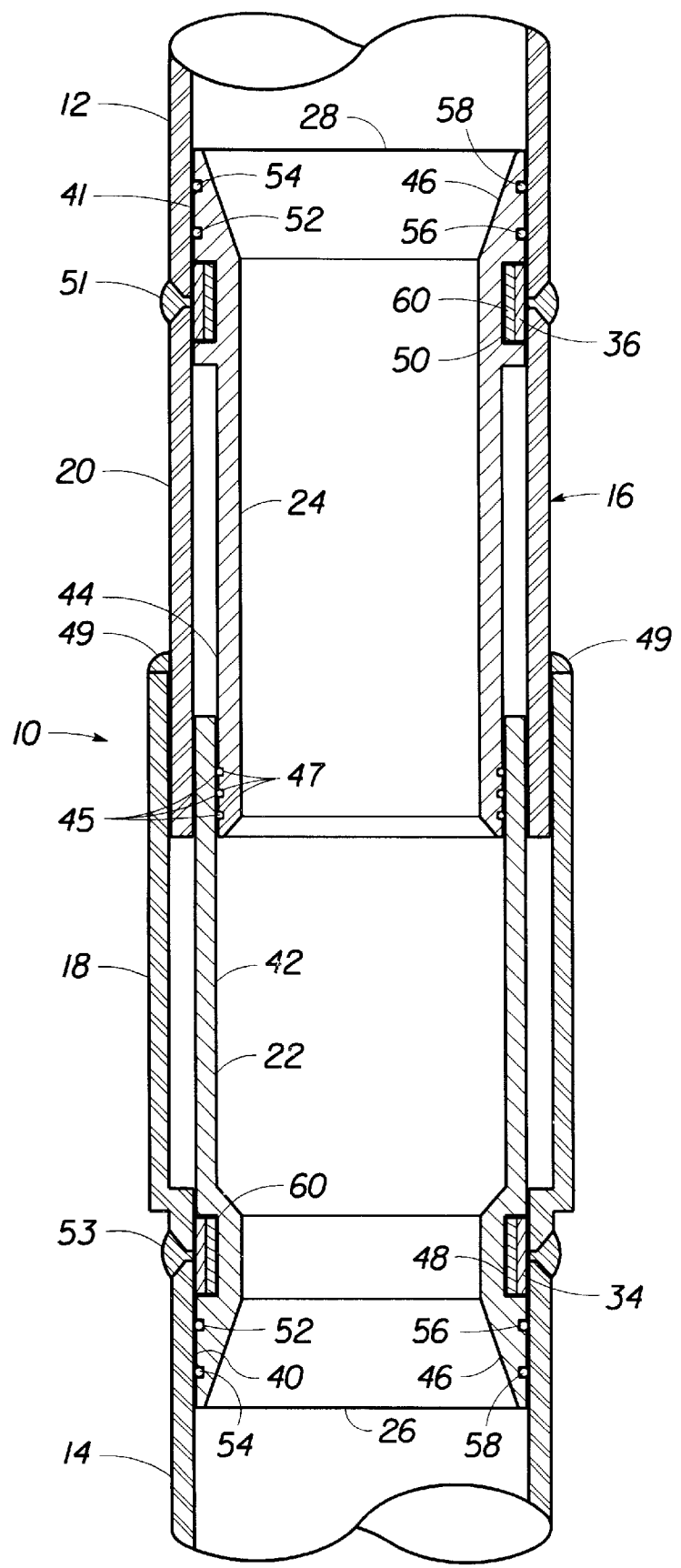
FIG. 2 is a sectional view of the connection of FIG. 1.

The sleeve assembly 16 is a generally tubular member, including an outer first telescoping sleeve 18 which slidingly receives a second sleeve 20 having an outer diameter that is only slightly less than the inner diameter of the first sleeve 18. A third sleeve 22 is positioned inside the second sleeve and has an outer diameter that is less than the inner diameter of the second sleeve 20 and an inner surface 42. The outer surface 40 of the third sleeve 22 contacts the inner surface of pipe end 14. Finally, a fourth sleeve 24 has a major outer surface portion 41 that contacts the inside surface of the pipe end 12 and a minor outer surface portion 44 that contacts the inside surface of the third sleeve 22. The minor outer surface portion 44 of the fourth sleeve 24 is provided in a sealed relationship with the inner surface 42 of the third sleeve 22. As shown in FIGS. 1 and 2, the surfaces 42,44 are sealed by a set of o-ring seals 45 disposed in grooves 47 to establish at least a static seal, and preferably a fluid tight seal. It is also preferred that the grooves 47 be designed to maximize compression on the o-ring.

The sleeves 22, 24 and their respective outer circumferential surfaces 40, 41 have a diameter slightly less than the minimum inner diameter tolerance of the pipe ends 12 and 14 into which the sleeve assembly 16 is to be inserted. This ensures that the sleeve assembly 16 may be inserted into any pipe ends 12, 14 which are within the tolerance range for the specific pipe size.

It should be appreciated that multiple sizes of sleeves 16, corresponding to the numerous available nominal pipe diameters, may be provided to cover the available ranges of pipe sizes which are connected by welding. The inner circumferential surfaces of the third and fourth sleeves 22, 24 have a diameter sized to allow an inspection pig, or other such pipe cleaning or flow volume separating mechanism, to pass therethrough. The ends 26, 28 of the sleeve assembly 16 preferably include a tapered inner surface 46, extending from the ends 26, 28 of the sleeve assembly 16 to a position interiorly of the sleeve ends 26,28. The tapered inner surface 46 is provided to help prevent a pig or other device from engaging the end of the sleeve assembly 16 and dislodging it, and to minimize resistance to flow of gases and fluids through pipe.

The outer surfaces 40 and 41 of sleeves 22 and 24, respectively, include alignment recesses 48 and 50 located near the ends 26 and 28 of the sleeve assembly 16 in which the rings 34 and 36 are at least partially received. The outer surface 40 has two seal grooves, 52, 54 extending circumferentially about the sleeve 22 between end 28 and the alignment recess 48. The grooves 52,54 are designed to provide maximum compression of the O-ring against the mating inner surface of the pipe ends 12,14. The first seal 56 is preferably a high temperature seal configured from a high temperature material, such as silicone, capable of withstanding a temperatures of approximately 300 degrees Fahrenheit or greater. The second groove 54 is positioned between the first groove 52 and the end 26 of the pipe to receive a second seal 58 such as an O-ring therein. The second seal 58 may be a material capable of withstanding temperatures of approximately 150 degrees Fahrenheit or greater. The opposing end 28 of the pipe assembly 16 where the fourth sleeve 24 contacts the inside surface of the pipe end 12 also has two seal grooves with seal elements disposed therein which are the same as the grooves and seals at end 26.

If the sleeve assembly 16 will be exposed to high pressures within the pipe, backup rings may be provided in the grooves 52, 54. These rings are preferably configured from a high temperature conformable material such as PTFE or Viton. The grooves 52, 54 are spaced a sufficient distance from the weld to ensure that the temperatures at the seals 58, 56 disposed therein do not exceed the maximum operating temperatures of the seal material therein.

In addition to sealing the weld area of the connection 10, the sleeve assembly 16 is configured to provide a heat shield to limit the passage of heat from the weld and into the inner diameter of the sleeve assembly 16. To limit the heat transfer from the weld, the alignment recesses 48, 50 may include a heat shielding or insulative member 60 received therein. The heat shielding member 60 is preferably a high temperature, high purity material, such as a ceramic tape or ceramic paper having a melting point of approximately 3200 degrees F. The heat shielding member 60 protects the sleeve assembly 16 from direct burning by the weld and insulates the sleeve assembly 16 from the heat generated by the weld. Ring members 34 and 36 are also received in the alignment recess 44, over the heat shielding member 60. The ring members 34 and 36 are preferably a metallic rings, which support the spacers 38 which are used to align the pipe ends 12, 14 for welding and to properly position the sleeve assembly 16 in the pipe ends 12, 14. However, the rings 34, 36 also tend to transfer heat away from the weld area. To limit the heat transfer from the ring members 34, 36 into the body of the sleeve assembly 16, the width of the ring members 34, 36 is preferably slightly smaller than the width of the alignment recesses 48, 50 and the insulative material 60 preferably extends between the base and sides of the ring members 34, 36 and the base and sides of the alignment recesses 48, 50. By isolating the ring member from direct contact with the mass of the sleeve assembly 16, the amount of heat transferred from the weld to the sleeve assembly 16 is reduced. This reduces the potential peak temperature experienced at the inner circumferential 42 of the sleeve assembly 16 to a level below that which would detrimentally affect the ability of the material exposed at the inner circumferential surface 42 of the sleeve assembly 16 to resist corrosion and/or erosion.

The end of the first sleeve 18 is preferably coupled to the ring member 34 and the end of the second sleeve 20 is preferably coupled to the ring member 36. This coupling may occur in any fashion, such as tack welding or the like, in order to allow the sleeves 18 and 22 to move together and maintain alignment of the rings 34,36 with the point of the welds 53,51 (See FIG. 2), respectively.

Preferably, the outermost sleeves 18, 20 are metallic, such as steel, stainless steel or the like. Conversely, the innermost sleeves 22, 24 may be made from metal, polymers, composites, coated metal or the like as deemed appropriate for the intended fluid service. To further limit heat transfer from the welds 51,53, the sleeves 22, 24 of the sleeve assembly 16 are preferably formed from a thermally insulative material such as PTFE, which may be filled with fiberglass or with a composition of 20% carbon and 5% graphite, or with a mineral oil based material approved by the FDA such as wollastimite, all of which are available from EGC, Corp. of Houston, Tex., or such other material having high heat stability, high abrasion resistance, low reactivity and low thermal creep. Making the sleeves 22, 24 from PTFE or a similar base material will limit the heat transfer from the weld through the sleeves to an amount that will not harm the seals 56, 58 and the inner circumferential surface 42 of the sleeve assembly 16 from excessive temperatures. Most preferably, the sleeves 22, 24 will be made from the same or similar material as that lining the adjacent pipe sections and will be at least as impervious to the fluids and gases passing through the welded connection as is the internal lining of the pipe.

FIG. 2 is a cross-sectional view of the sleeve assembly 16 of the present invention in an extended or telescoped position and welded to the pipe ends 12 and 14 along welds 51 and 53, respectively. To prepare the pipe joint shown in FIG. 2, the sleeve assembly 16 is first prepared by compressing the ring members 34, 36 into the alignment recesses 48, 50 over an insulative member 60, and the ends of the ring members 34, 36 are tack welded together. This may be performed on site, or the ring members 34, 36 may be tack welded in place when the sleeve is manufactured, or at intermediate steps in between. The sleeve assembly 16, with the seals 56, 58 on the outer surface of the third sleeve 22 and the outer surface of the fourth sleeve 24, the insulative member 60, and the ring members 34, 36 thereon, is loaded into the first pipe end 12 until the spacers 38 are in contact with, or immediately adjacent, the pipe end 12. Then, the sleeve assembly 16 is positioned in the second pipe end 14 until the pipe end contacts the spacers 38.

At this point, the pipe ends 12, 14 are tack welded to the assembly 16 at multiple discrete locations between the spacers 38 without incorporating the spacers 38 into the weld. For example, if three pins are used, three tack welds may be located to connect the pipe ends 12, 14 midway between the three spacers 38. The spacers 38 are then removed, preferably by hitting the portion thereof extending outwardly beyond the pipe ends 12, 14 with a hammer. Then the weld is completed in multiple passes. During the initial passes of welding, a small gap is maintained to allow air to vent from the area between the sleeve assembly 16 and the pipe ends 12, 14, and the gap is closed during the welding process. Additionally, the first and second sleeves 18, 20 are welded together, such as with filet weld 49, in order to seal the pipe and increase the strength of the assembly.

The sleeve assembly 16 provided herein provides an adjustable connector for joining adjacent pipe ends 12, 14 with weld joints. In non-corrosive or non-hazardous service, the sleeves of sleeve assembly 16 may not be separately coated with a protective barrier to prevent corrosion or erosion thereof. Additionally, the sleeves of the sleeve assembly 16 may be used without the risk of affecting the weld by the sacrificing of alignment loss, i.e., the spacer 38, material into the weld. Further, the portion of the protective coating on the inside of the pipe ends 12, 14, which would be burned or otherwise modified by the heat of welding to the point where it loses its protectiveness is limited to the areas protected by the seals 56, 58, and the inner diameter of the sleeve assembly 16 is not adversely affected by the weld heat where the sleeve assembly 16 is made from an insulative material. Further, because the edges of the ring members 34, 36 are isolated from the sleeve assembly 16 by an insulative member 60, the quantity of the weld heat which actually transfers to the inner diameter of the sleeve is reduced. Therefore, if the sleeve assembly 16 is a coated metallic member, the inner coating of the sleeve assembly 16 is far less likely to be affected by the weld heat.

Where the sleeves 22, 24 are configured as solid insulative elements, such as from PTFE, they may be used without deleterious effect even if they are cut or nicked, because no base metallic material can be exposed. Further, where the sleeves 22, 24 are non-metallic, a magnetic inspection pig may more easily inspect the pipe and weld area, because no secondary metallic barrier extends over the weld. Finally, the multiple seal arrangement ensures that the sleeves of sleeve assembly 16 will protect the weld area irrespective of the size of the pipe within each pipe size tolerance.

Figure 3:
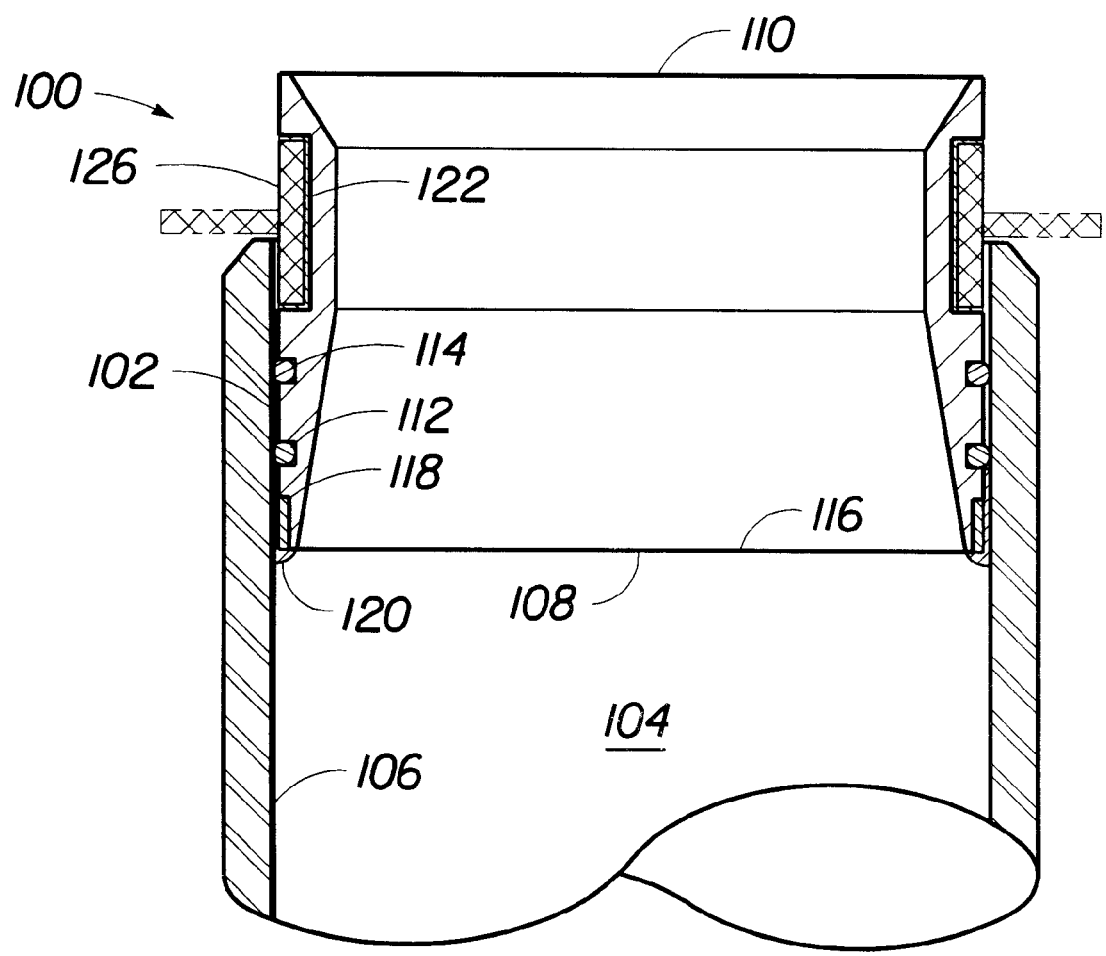
FIG. 3 is a sectional view of a pipe plug of the present invention.

FIG. 3 is a sectional view of another embodiment of the present invention relating to a temporary plug which is particularly useful when a section of pipe is being repaired or otherwise joined to another section of pipe and residual gases or fluids may be present in the pipe. The plug 100 is generally cylindrical, having an outer surface 102 with an outer diameter that is only slightly less than the inner diameter 106 of the pipe section 104 being repaired, and opposing ends 108, 110. The outer surface 102 has two sealing grooves 112, 114 that can be filled with sealing elements such as O-rings. The end 108 of the plug is covered with a temporary barrier 116 that blocks vapors at near atmospheric pressure from exiting the pipe end 104 while the pipes are being welded together. The barrier 116 is secured on the outer surface of the plug with a retaining ring 118 surrounded by a compressive sealant 120, such as silicon. The ring 118 and sealant 120 provide sufficient resistance to hold the barrier in place and contain fluids present in the pipe at near ambient pressures. However, the ring 118 and sealant 120 are easily broken or displaced under operating pressures once the welds are in place and the barrier 116 is allowed to pass through the pipe with the fluid flow. The plug 100 is shown with an optional recess 122 for receiving insulation and a metal ring member 126 like the ring members 34 and 36 described above. The ring member 126 can be used as a welding point, however, the ring member 126 may not be necessary if the pipe sections being welded are not coated because the heat will not damage the pipe and furthermore, the potentially flammable vapors are contained by the barrier 116.

Although the preferred embodiments of the invention have been described embodying multiple features of the invention, each of the individual features of the invention may be used separately, or concurrently, to provide improvements in the connection of pipe ends 12,14. For example, the ring members 34, 36 may be configured of non-metallic members, or the spacers 38 may extend through the ring members 34, 36, and be semi-permanently affixed to the sleeve. The ring may also be formed from a material having low thermal conductivity which, when coupled against a ferrous material such as the pipe, does not create a galvanic reaction but is attachable to the weld. In such circumstance, the ring members 34, 36 may be embedded in the sleeve assembly 16, or integrally formed therein.

While the foregoing is directed to the preferred embodiment of the present invention, other and further embodiments of the invention may be devised without departing from the basic scope thereof, and the scope thereof is determined by the claims which follow.

What is claimed is:

1. A pipe connector comprising:
an extendable pipe structure having a middle, first and second pipe ends and first and second concentric pipe sleeves extending from the first and second pipe ends toward the middle, wherein the concentric pipe sleeves are engaged in a telescopic relationship;
an extendable pipe liner having a middle, first and second liner ends and first and second concentric liner sleeves extending from the first and second liner ends toward the middle, wherein the concentric liner sleeves are engaged in a sealed telescopic relationship; and
wherein the first and second liner ends are coupled to the first and second pipe ends and extend beyond the first and second pipe ends, wherein the portion of the first and second liner ends extending beyond the first and second pipe ends have one or more sealing members disposed in the outer cylindrical surface thereof, and wherein the first and second liner sleeves are supported by the first and second pipe sleeves.

2. The pipe connector of claim 1, further comprising a barrier extending over the first liner end;

wherein the outer surface of the first liner end sealingly engages the inside surface of a pipe end.

3. The pipe connector of claim 2, wherein the outer surface of the first liner end comprises at least one circumferentially extending recess.

4. The pipe connector of claim 2, further comprising a barrier ring positioned around the barrier to hold the barrier over the first liner end.

5. The pipe connector of claim 2, wherein the inner surface of the first liner end tapers toward the first end.

6. The pipe connector of claim 3, further comprising a sealing element positioned within the recess.

7. The pipe connector of claim 5, further comprising at least one circumferential recess disposed in the outer surface of the first liner end.

8. The pipe connector of claim 1, wherein the inner surface of the first concentric sleeve forms an annular shoulder in one end of the pipe structure facing the middle of the pipe structure and contacts an outer surface of the second concentric sleeve.

9. The pipe connector of claim 1, further comprising at least one circumferential recess disposed in the outer surface of the first liner end.

10. The pipe connector of claim 8, wherein the recess has a metal ring disposed therein.

11. The pipe connector of claim 1, where the first concentric liner sleeve has an inner surface that forms an annular shoulder in one end of the liner facing the middle of the pipe liner, wherein the inner surface of the first concentric sleeve sealingly contacts the outer surface of the second concentric liner sleeve.

12. The pipe connector of claim 1, further comprising a first metal ring disposed in a first circumferential recess formed in the outer surface of the first liner end and a second metal ring disposed in a second circumferential recess formed in the outer surface of the second liner end.

13. The pipe connector of claim 12, wherein the first and second liner ends are coupled to the first and second pipe ends by welding the first and second metal rings to the first and second pipe ends.

* * * * *